(12) United States Patent
Tifford

(10) Patent No.: US 7,788,137 B1
(45) Date of Patent: Aug. 31, 2010

(54) METHOD AND SYSTEM FOR PRICE VARIABILITY OF A SERVICE

(75) Inventor: Alan Tifford, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 591 days.

(21) Appl. No.: 11/788,405

(22) Filed: Apr. 19, 2007

(51) Int. Cl.
G06Q 30/00 (2006.01)
G06F 17/22 (2006.01)

(52) U.S. Cl. .............. 705/26; 705/27; 705/31

(58) Field of Classification Search ........... 705/26, 705/27, 31
See application file for complete search history.

(56) References Cited

U.S. PATENT DOCUMENTS

| | | | |
|---|---|---|---|
| 6,202,052 B1 * | 3/2001 | Miller | 705/31 |
| 7,565,312 B1 * | 7/2009 | Shaw et al. | 705/31 |
| 7,590,572 B2 * | 9/2009 | Larson | 705/31 |
| 2002/0091602 A1 * | 7/2002 | Stern et al. | 705/35 |
| 2002/0120554 A1 * | 8/2002 | Vega | 705/37 |
| 2003/0158784 A1 * | 8/2003 | Shaver et al. | 705/26 |
| 2004/0220853 A1 * | 11/2004 | Schramm | 705/14 |
| 2006/0059070 A1 * | 3/2006 | Petruck | 705/35 |
| 2006/0173739 A1 * | 8/2006 | Heywood | 705/14 |
| 2007/0136157 A1 * | 6/2007 | Neher et al. | 705/31 |
| 2009/0024694 A1 * | 1/2009 | Fong | 709/203 |
| 2009/0030789 A1 * | 1/2009 | Mashinsky | 705/14 |

OTHER PUBLICATIONS

"Online services, software let taxpayers file returns with new level of e's". (Gibes, Al. Las Vegas Review—Journal. Las Vegas, Nev.: Mar. 28, 2006. p. 2.D.).*
Moneyline—Software may make Apr. 15 less taxing. Neil Downing. The Providence Journal. Providence, R.I. Apr. 15, 2003. p. E.01.*
Which tax program fits you?; All demystify jargon, math, but some are better than others. Sandra Block. USA Today. McLean, VA.: Feb. 25, 2005. p. B.4.*

* cited by examiner

Primary Examiner—Jason B Dunham
Assistant Examiner—Courtney Stopp
(74) Attorney, Agent, or Firm—Osha • Liang LLP

(57) ABSTRACT

A computer implemented method for determining a price for a service includes determining a price range for the service based on data associated with a prospective user of the service, transmitting the price range to the prospective user, enabling access to the service based on an acceptance of the price range by the prospective user, and transmitting a final price within the price range to the prospective user, wherein the final price is based on use of the service by the prospective user.

29 Claims, 7 Drawing Sheets

METHOD AND SYSTEM FOR PRICE VARIABILITY OF A SERVICE

BACKGROUND

Services are increasingly offered using software accessed over a computer network. The software, sometimes called on-demand software, is provided by a business known as an application service provider (ASP). ASPs have developed due to increasing costs associated with offering specialized software, as well as difficulties in distributing and upgrading the software on separate hosts. ASPs provide services for entities such as businesses, government organizations, non-profit organizations, membership organizations, and individual users.

ASPs are typically divided into several categories. Specialist or functional ASPs provide a single service or function, such as a credit card payment processing or timesheet service. Vertical market ASPs create packaged solutions for a specific customer type, such as a medical or dental practice. Enterprise ASPs deliver broad spectrum solutions, such as resource management, e-commerce, and customer relationship management, to large organizations and corporations. Local ASPs provide services to small businesses within a limited area.

ASPs typically share a set of common features. First, the software applications that provide the services are owned and operated by the ASPs. In addition, the servers that provide the software are also owned, operated, and maintained by the ASPs. The services are generally accessed through a browser or thin client over a network, such as the Internet. The network-based nature of ASPs allow greater reliability, scalability, availability, and security of the products and services provided by the ASPs.

Clients of the ASP are typically charged on a per-use basis, or pay for use of a service over a period of time, such as a week, month, or year. Additionally, clients may be charged extra for access to certain features of the service, or may pay for tiered features of the service. For example, a customer may pay $20 for basic access to the service, $30 for a "plus" package that enables additional features, or $40 for "premium" access to all features provided by the ASP. Alternatively, the customer may pay a fee for basic access to the service and select certain features to add onto the service. The customer may then be billed for each additional feature he/she selects.

SUMMARY

In general, in one aspect, the invention relates to a computer implemented method for determining a price for a service, comprising determining a price range for the service based on data associated with a prospective user of the service, transmitting the price range to the prospective user, enabling access to the service based on an acceptance of the price range by the prospective user, and transmitting a final price within the price range to the prospective user, wherein the final price is based on use of the service by the prospective user.

In general, in one aspect, the invention relates to a system for determining a price for a service, comprising a user interface, wherein the user interface is configured to communicate with a prospective user of the service, and a business management system, comprising a fee management system, and a user data repository, wherein the fee management system determines a price range based on data associated with the prospective user, wherein the fee management system enables access to the service by the prospective user based on an acceptance of the price range by the user, and wherein the fee management system determines a final price within the price range, wherein the final price is based on use of the service by the prospective user.

In general, in one aspect, the invention relates to a computer readable medium containing software instructions embodied therein for causing a computer system to perform a method for determining a price for a service, the method comprising determining a price range for the service based on data associated with a prospective user of the service, transmitting the price range to the prospective user, enabling access to the service based on an acceptance of the price range by the prospective user, and transmitting a final price within the price range to the prospective user, wherein the final price is based on use of the service by the prospective user.

In general, in one aspect, the invention relates to a method for obtaining user access to a service, comprising accessing a business management system, wherein the business management system provides the service, receiving a first price range from the business management system, wherein the first price range is based on data associated with a user, accessing the service based on an acceptance of the first price range, and receiving a final price within the first price range, wherein the final price is based on use of the service by the user.

Other aspects of the invention will be apparent from the following description and the appended claims.

DETAILED DESCRIPTION

Figure 1:
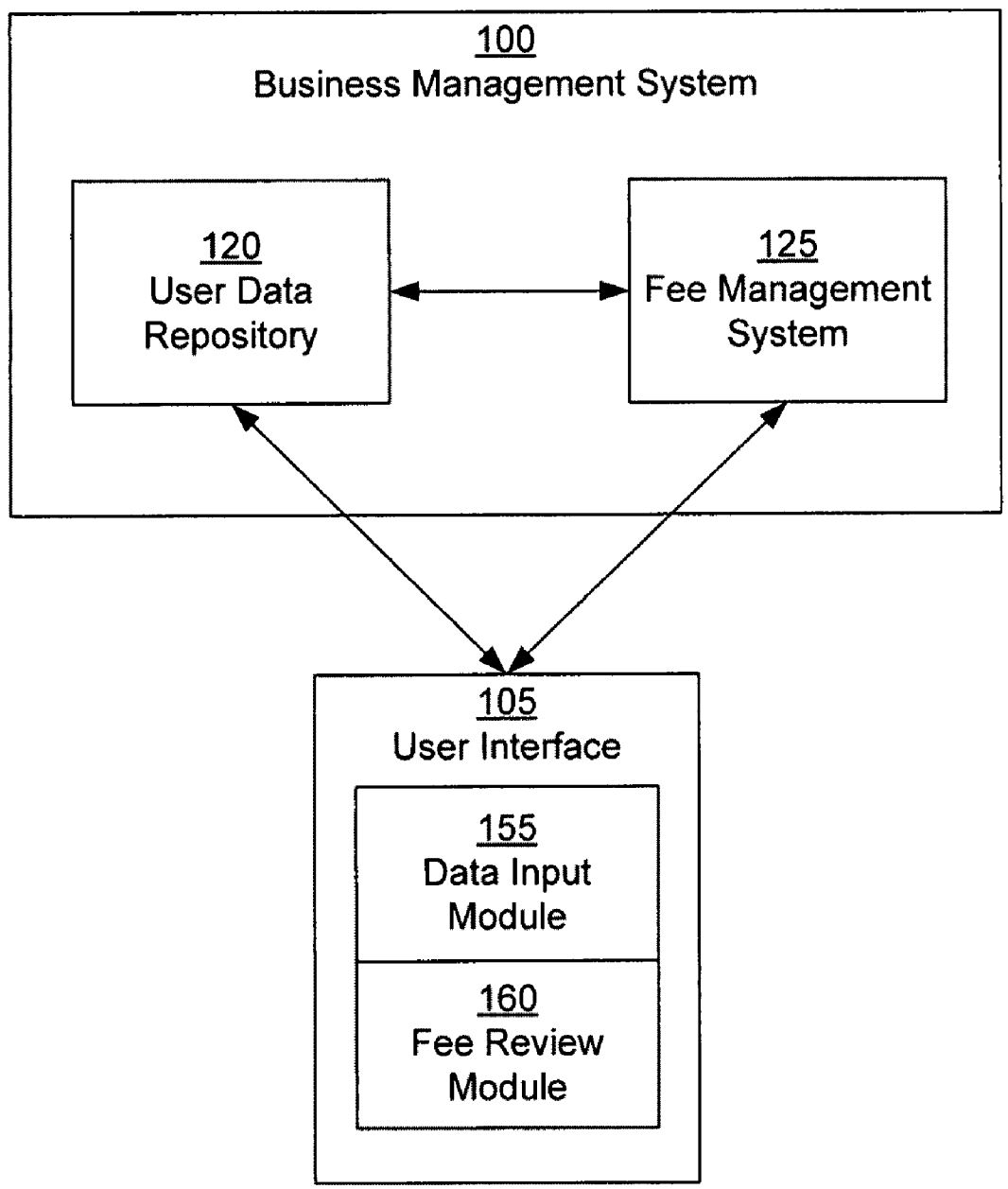
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to determine a price for a service. Specifically, embodiments of the invention provide a method and apparatus to determine a price range for a service based on data about a potential user of the service. A final price within the price range is determined after the potential user has accepted the price range and used the service. The service may be offered by an application service provider (ASP) and may include a tax preparation service, a medical patient and claim management service, an accounting service, and/or any useful service or combination of services.

FIG. 1 shows a schematic diagram of a system in accordance with one or more embodiments of the invention. As shown in FIG. 1, the system includes a business management system (100) and a user interface (105). Each of these components is described below.

The business management system (100) provides services to users through one or more interfaces (e.g., user interface (105)). The interfaces allow the user of the services to interact with various components of the business management system (100) using a user-friendly environment (e.g., a graphical user interface (GUI)). Further, because of the sensitive nature of information exchanged between the user and the business management system (100), these interfaces are often secure connections employing various known techniques for keeping sensitive information secure. In one or more embodiments of the invention, the business management system (100) provides financial (e.g., accounting and/or tax preparation) services to users of the business management system (100). Alternatively, the business management system (100) may also provide services related to one or more similar services, such as a medical, insurance, and/or legal practice. For example, the business management system (100) may include functionality to create and edit forms, analyze lab results, submit and store claims, calculate expenses and insurance coverage, and/or other actions related to the service. In one or more embodiments of the invention, certain users of the business management system (100), such as accountants and tax attorneys, may provide services to other users of the business management system (100).

In one or more embodiments of the invention, the business management system (100) is implemented using a client-server architecture. The business management system (100) itself may be an enterprise application running on one or more servers, and in some embodiments could be a peer-to-peer system, or resident upon a single computing system. In addition, the business management system (100) is accessible from other machines using interfaces, such as the user interface (105). In one or more embodiments of the invention, the user interface (105) includes one or more web pages that can be reached from a computer with a web browser and/or internet connection. Alternatively, the user interface (105) may be an application that resides on a computing system, which may include personal computers (PCs), mobile phones, personal digital assistants (PDAs), and other digital computing devices of the users, and that communicate with the business management system (100) through one or more network connections and protocols. Regardless of the architecture of the system, communications between the business management system (100) and the user interface (105) may be secure, as described above.

In one or more embodiments of the invention, the business management system (100) provides services to users as an application service provider (ASP). In other words, the business management system (100) is accessed over a network connection (not shown), such as the Internet, by one or more users. Information and/or services provided by the business management system (100) are also stored and accessed over the network connection. In one or more embodiments of the invention, the user interface (105) corresponds to a web interface used to access the business management system (100) and any services provided by the business management system (100) as an ASP.

As shown in FIG. 1, the business management system (100) also includes a user data repository (120) and a fee management system (125). The user data repository (120) includes data about users of the business management system (100). For example, for each user of the business management system (100), the user data repository (120) may include an entry with information such as the user's name, address, phone number, date of birth, marital status, login, password, credit card information, bank account information, and/or other information relevant to the use of the business management system (100) by the user. As another example, if the business management system (100) provides tax preparation services to the user, the user data repository (120) may also include the user's social security number, gross income, tax bracket, sources of income, deductions, credits, exemptions, tax filing status, tax payment history, etc. By accessing the user interface (105), the user is able to enroll in the business management system (100) and add, update, or delete information in the user data repository (125). For example, the user may choose to add a new family member, delete an address, update his/her marital status, change his/her password, or perform another task.

In one or more embodiments of the invention, users of the business management system (100) pay for access to the business management system (100). In one or more embodiments of the invention, the fee management system (125) calculates the price a user pays to access the business management system (100) and/or use a service provided by the business management system (100). In one or more embodiments of the invention, the price for access to the business management system (100) is based on data about the user requesting the access. In other words, two users may be charged different amounts for accessing the same service or feature of the business management system (100).

In addition, the fee management system (125) may calculate a price range based on data about the user requesting access to the business management system (100). In one or more embodiments of the invention, the price range includes a lower bound and an upper bound. The price range may be presented to the user, who may choose to accept or reject the price range. The user may also be presented with one or more price adjustment options and receive a new price range based on his/her selection of the price adjustment options. If the user accepts the price range, the user is guaranteed a final price within the price range for use of the business management system (100) and/or a service provided by the business management system (100). In one or more embodiments of the invention, the final price is determined by the ultimate use of the business management system (100) by the user. Further, the final price may be applied as a fee for a one time use of the business management system (100), or for a subscription fee or lifetime fee.

For example, the business management system (100) may provide a tax preparation service to users of the business management system (100). A user may provide information related to the use of the tax preparation service, such as his/her name, address, telephone number, email address, a login, and a password. The business management system (100) may also request additional information about the user, such as the user's gross and/or net income, deductions and exemptions, tax filing status, etc. Those skilled in the art will appreciate that the business management system (100) may obtain the additional information from the user, or from other sources, such as government agencies, banks, credit bureaus, or the user's employer.

Based on the data obtained about the user, the fee management system (125) calculates a price range for the user to prepare his/her taxes on the business management system (100). The fee management system (125) may calculate the price range using one or more rules or heuristics to determine an optimal price range for the user. For example, the fee management system (125) may produce a higher price range for a user with a higher net income or a large number of deductions, whereas the fee management system (125) may produce a lower price range for a user with a lower net income or few exemptions.

Once the user has accepted the price range, the user is granted access to prepare his/her taxes on the business management system (100). During preparation, the user may choose to use one or more special features provided by the business management system (100), such as an audit protection feature or deduction maximization feature. In addition, the user may choose to use or not use certain forms for filing taxes. Based on the user's use of the tax preparation service, the fee management system (125) calculates a final price within the price range. The user is presented with the final price as a fee for using the tax preparation service in the business management system (100). As mentioned above, the final price may be paid for a single use of the business management system (100) by the user, or as a recurring payment for a subscription to the business management system (100) by the user. For example, if the user pays quarterly taxes, the user may pay for recurring use of the service for a set period of time (e.g., one year).

The user interface (105) may be a web interface, GUI, command line interface, or other interface accessible through a computer system. Using the example above, the user interface (105) may allow a user to access and use a tax preparation service on the business management system (100). The user interface (105) also includes a data input module (155) and a fee review module (160).

In one or more embodiments of the invention, the data input module (155) allows a user to enter data related to his/her use of the business management system (100). For example, the data input module (155) may be structured as a set of forms with fields for entering information. Additionally, the data input module (155) may allow the user to upload one or more documents, such as word processing documents, spreadsheets, etc., containing data relevant to the use of the business management system (100). For example, if the business management system (100) provides a tax preparation service, the user may upload documents such as tax returns, bank statements, accounting records, investment records, mortgage documents, tax forms, or other documents related to the user's tax filings. In one or more embodiments of the invention, data entered into the data input module (155) is stored into one or more entries corresponding to the user in the user data repository (120).

In one or more embodiments of the invention, the fee review module (160) allows a user to receive a price range for accessing one or more features and/or services of the business management system (100). The user may also accept or reject the price range using the fee review module (160), as well as select one or more price adjustment options for modifying the price range. In addition, the user may receive a final price for using the business management service (100) through the fee review module (160). Fee review is explained in greater detail in FIG. 3.

Figure 2:
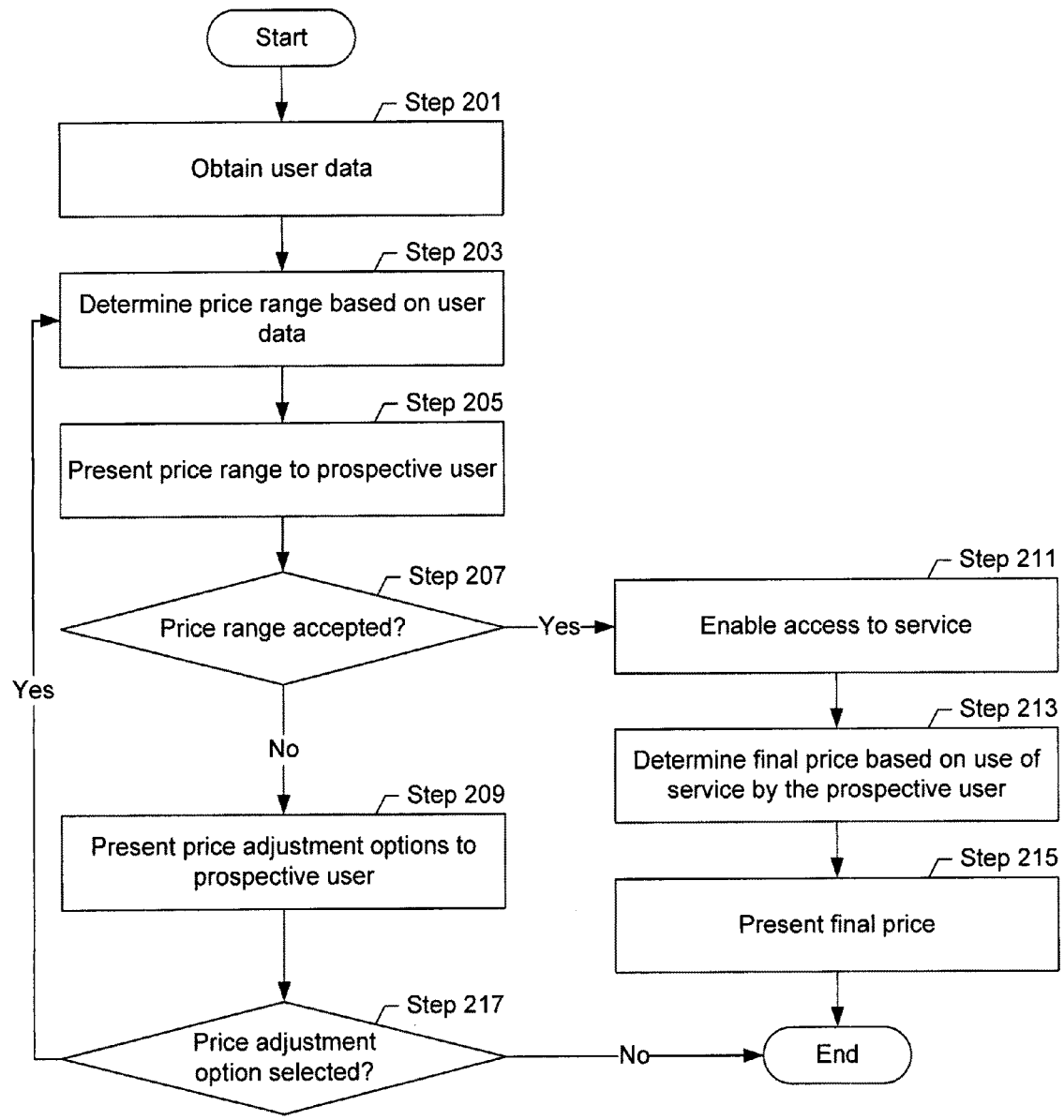
FIGS. 2-3 show flow diagrams in accordance with one or more embodiments of the invention.

FIG. 2 shows a flow diagram of fee calculation for use of a service in accordance with one or more embodiments of the invention. In one or more embodiments of the invention, one or more of the steps described below may be omitted, repeated, and/or performed in a different order. Accordingly, the specific arrangement of steps shown in FIG. 2 should not be construed as limiting the scope of the invention.

Initially, data about one or more user(s) is obtained (Step 201). As mentioned above, the data may be obtained from the prospective user, or the data may be obtained from other sources, such as government agencies and/or public records. In addition, data from previous uses of the service may be stored. For example, if the service is a tax preparation service, the user may have a history of tax filing records from using the service in previous years. The history, user-supplied data, and/or government and public records may all be used to determine a price range for the prospective user (Step 203). In one or more embodiments of the invention, data used to determine the price range includes the prospective user's demographic (e.g., age, gender, race, social class, etc.), income, tax filing status, tax obligation, tax history, complexity of tax preparation, loyalty level (e.g., how many years the user has used the service), and previous prices paid for the service by the prospective user. Further, data used to determine the price range may include aggregate data about other users of the service. For example, the price range may be influenced by the acceptance or rejection of price ranges from users similar to the prospective user.

The price range is presented to the prospective user (Step 205), and a determination is made regarding whether the prospective user has accepted the price range or not (Step 207). If the prospective user has accepted the price range, the prospective user is allowed to access the service (Step 211). The final price is then calculated based on the use of the service by the prospective user (Step 213). For example, the prospective user may use one or more special features of a tax preparation service, including an investment tool, a rental property tool, a charitable contribution calculator, a deduction maximizing tool, a home business tool, a state filing tool, a refund tool, a tax review tool, and/or an audit protection tool. The use of special features may cause the final price to be higher. In addition, the prospective user may receive a tax refund or owe additional taxes to the government. The prospective user's tax obligation may also influence the final price for using the tax preparation service. For example, if the prospective user receives a significant tax refund, the final price may be on the higher end of the price range, whereas if the prospective user owes tax to the government, the final price may be on the lower end of the price range (or vice-versa). In one or more embodiments of the invention, the final price is also based on data gathered about the user during the use of the service (e.g., tax obligation, adjusted gross income, number of dependents, etc.). Once the final price is determined, the final price is presented (Step 215) as a fee for use of the service.

If the prospective user does not accept the price range, one or more price adjustment options are presented to the prospective user (Step 209). The price adjustment options may allow the prospective user to select or deselect features of the service. The price adjustment options may also give the prospective user a discount for using certain features of the service. For example, the prospective user may receive a discount on a tax preparation service if he/she chooses to receive his/her tax refund using direct deposit. Those skilled in the art will appreciate that other promotions, features, and options may exist for allowing the user to adjust the price range for using the service.

A determination is made regarding the user's selection of one or more price adjustment options (Step 217). If the prospective user does not accept the price range and does not select any price adjustment options, the prospective user has declined use of the service with respect to the price range and price adjustment options. However, if the prospective user has selected one or more price adjustment options, a new price range is calculated based on data about the prospective user as well as the selected price adjustment option(s) (Step 203) and presented to the prospective user (Step 205). The prospective user may or may not accept the new price range (Step 207). The prospective user may also select more price adjustment options (Step 217) to adjust the price range further, use the service with the new price range (Step 211), or exit the fee calculation process.

Figure 3:
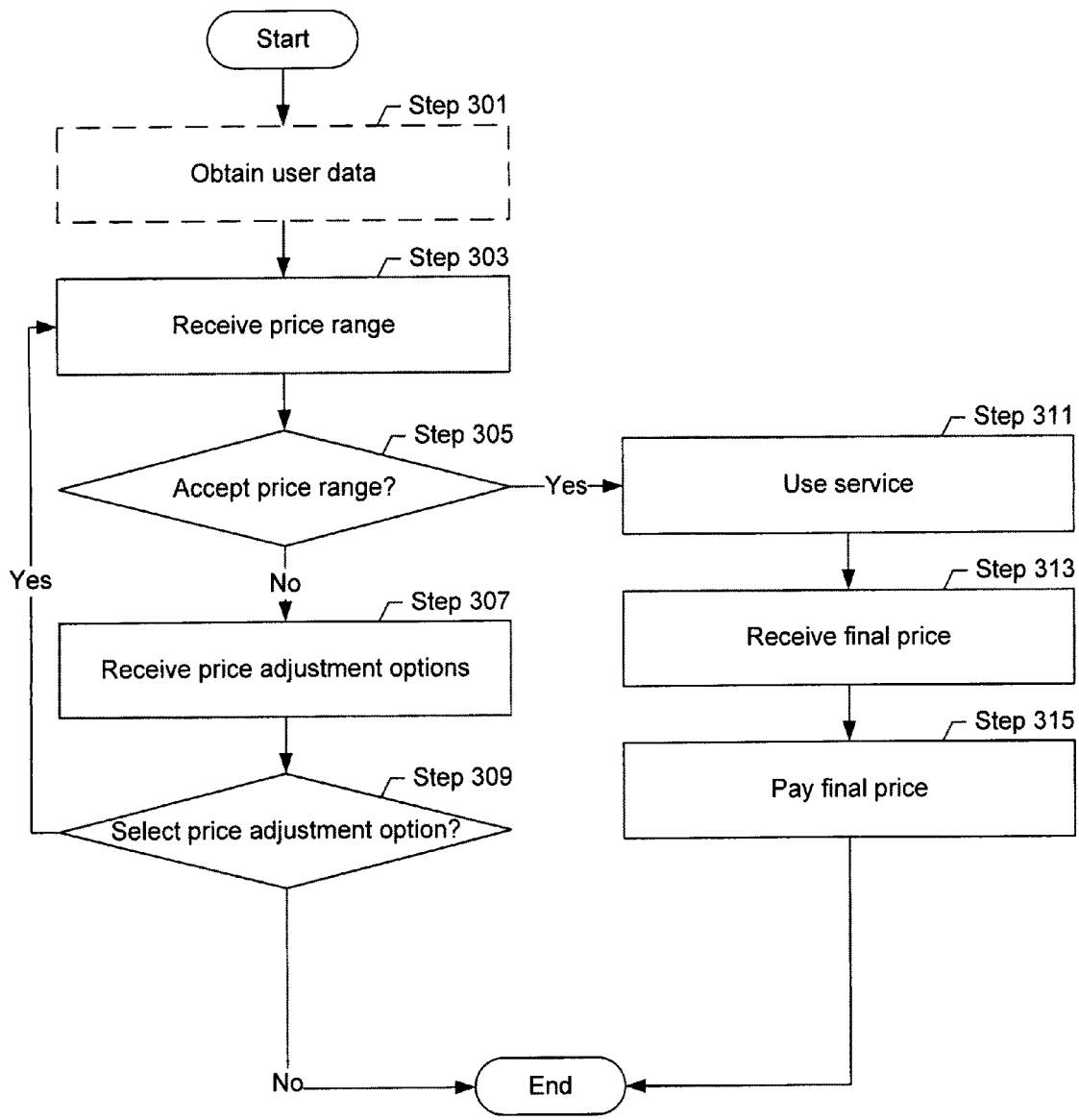

FIG. 3 shows a flow diagram of user fee review for a service in accordance with one or more embodiments of the invention. In one or more embodiments of the invention, one or more of the steps described below may be omitted, repeated, and/or performed in a different order. Accordingly, the specific arrangement of steps shown in FIG. 3 should not be construed as limiting the scope of the invention.

Initially, user data is obtained (Step 301). As described above, the data may be entered in form fields on a user interface, such as a GUI or web interface, or the data may be uploaded in one or more documents, such as word processing documents, spreadsheets, portable document format (PDF) files, etc. In addition, user-entered data may be optional because the data may already be stored in a location that is accessible by the service, or the data may be obtained from government agencies and/or public records.

The prospective user receives a price range (Step 303) based on user data. As mentioned previously, the price range corresponds to a lower and upper bound for charging the user for access to the service. In other words, the user is guaranteed a price within the price range for use of the service. The user may choose to accept or reject the price range (Step 305) as presented. If the price range is accepted by the user, the prospective user may use the service (Step 311), receive a final price for use of the service (Step 313), and pay the final price (Step 315).

If the prospective user does not accept the price range, the prospective user may receive one or more price adjustment options (Step 307). As mentioned above, the price adjustment options may include features, options, and/or promotions that adjust the price range more favorably for the user. For example, the prospective user may receive a discount for filling out a survey after using the service, or the prospective user may receive a bundled discount for using multiple services or features. In addition, the prospective user may choose not to use one or more special features to lower one or both ends of the price range.

The prospective user may choose to select one or more price adjustment options (Step 309). If the prospective user does not select any price adjustment options, the prospective user may be deemed to be treated as declining the use of the service with respect to the quoted price range and/or the price adjustment options. If the prospective user selects one or more price adjustment options, the prospective user may receive a new price range (Step 303) and decide whether or not to accept the new price range (Step 305). This process may continue until the prospective user accepts the price range, uses the service (Step 311), receives a final price within the price range for using the service (Step 313), and pays the final price (Step 315). On the other hand, the prospective user may choose to reject the price range, with or without price adjustment options.

Figure 4A:
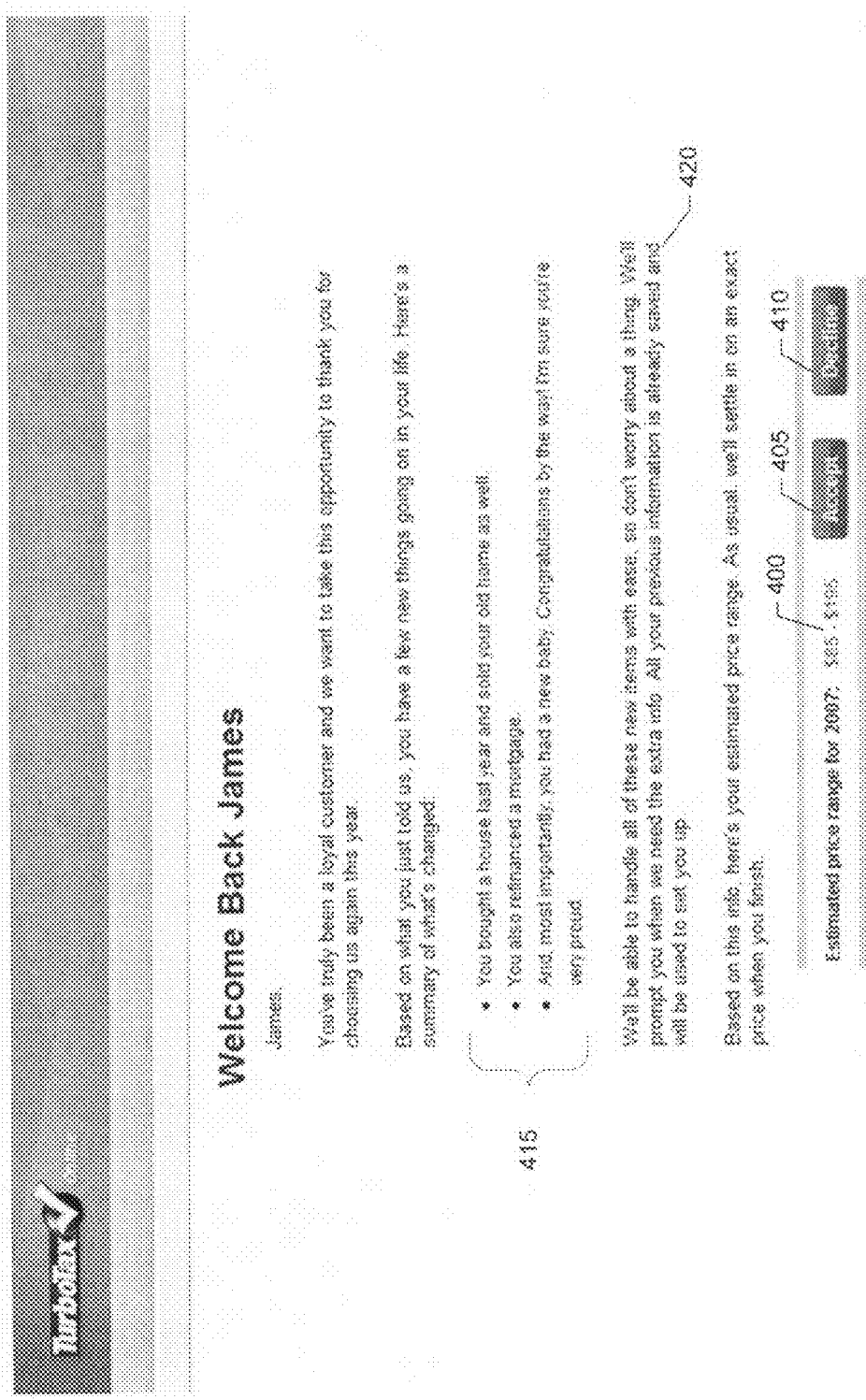
FIGS. 4A-4C show screenshots in accordance with one or more embodiments of the invention.
Figure 4B:
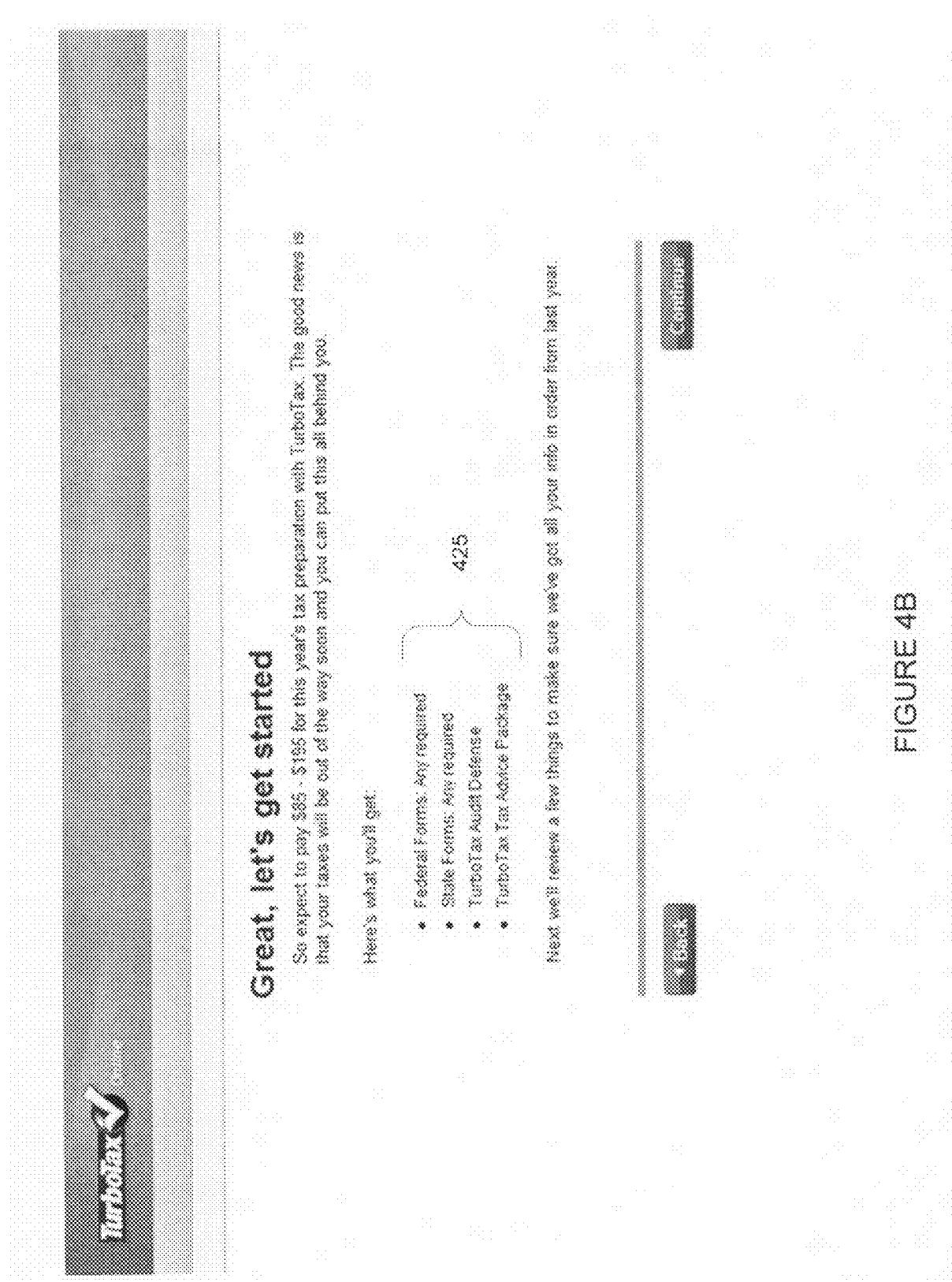
Figure 4C:
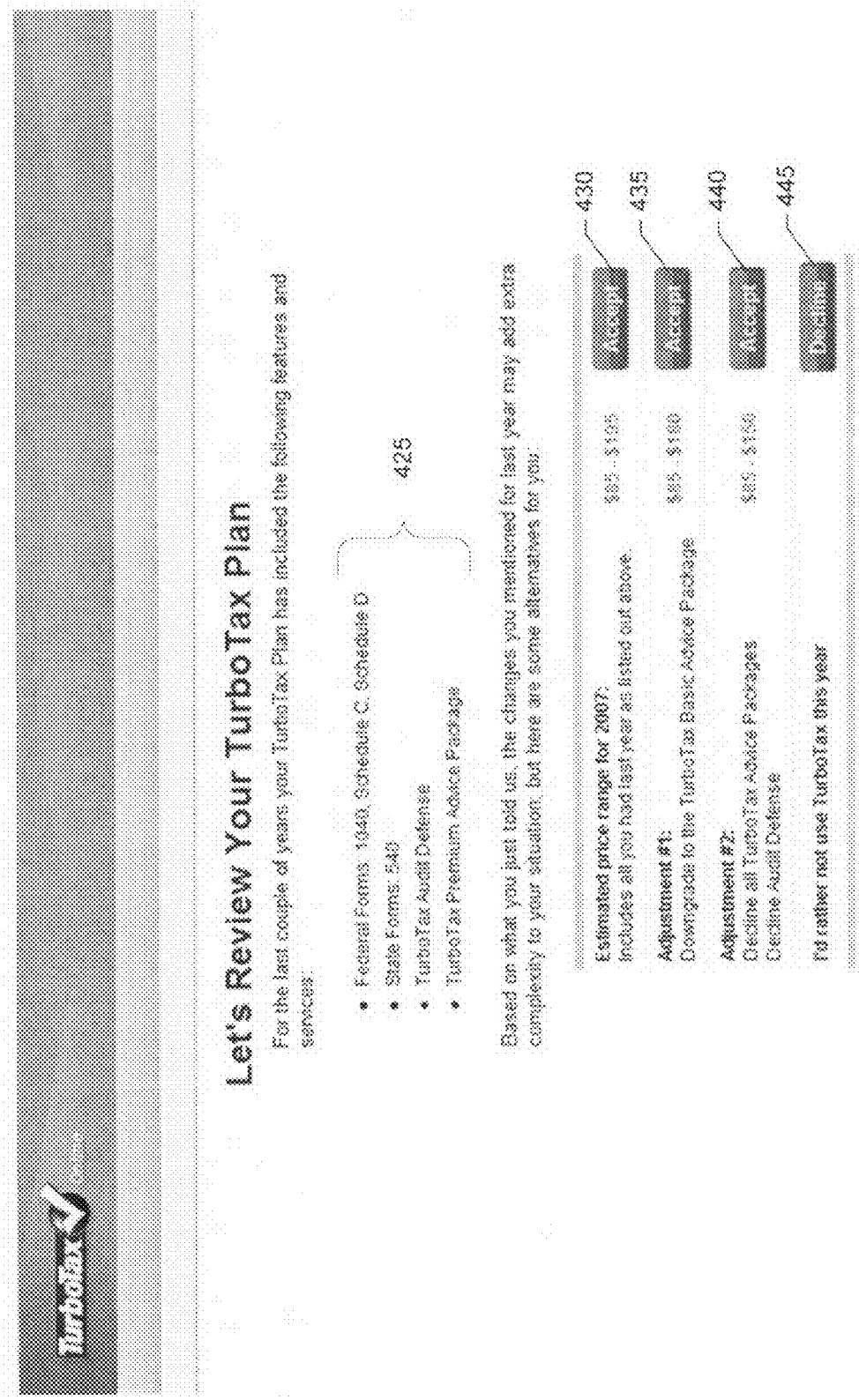

FIGS. 4A-4C show examples of user price range selection interfaces in accordance with one or more embodiments of the invention. In one or more embodiments of the invention, FIGS. 4A-4C correspond to examples of displays found in the user interface of FIG. 1.

FIG. 4A shows an example screenshot of a price range review page for a tax preparation service provided by TurboTax™ (TurboTax is a registered trademark of Intuit, Inc.). In one or more embodiments of the invention, FIG. 4A corresponds to an element of the fee review module of FIG. 1. As shown in FIG. 4A, a price range (400) of $85-195 is calculated based on information about the user. As described above, the information may include a history of data about the user, public and government records, and/or user-supplied data.

In one or more embodiments of the invention, the price range (400) of FIG. 4A is calculated based on new information supplied by the user (415), as well as information (420) stored from previous use of the tax preparation service by the user. The user may choose to accept (405) the price range as presented, or decline (410) the price range. If the user accepts the price range, the service may proceed to the display shown in FIG. 4B.

FIG. 4B shows a feature review page for a tax preparation service in accordance with one or more embodiments of the invention. In one or more embodiments of the invention, the display of FIG. 4B is shown to a user once the user has accepted a price range, such as the price range of $85-195 in FIG. 4A. In addition, FIG. 4B displays a list of features (425) accessible by the user in accepting the price range. As mentioned above, the final price is determined based on use of the service by the user, which may proceed after the feature review page of FIG. 4B is displayed to the user.

FIG. 4C shows a tax preparation review page in accordance with one or more embodiments of the invention. In one or more embodiments of the invention, the display of FIG. 4C is shown to a user if the user declines the initial price range offered, such as the price range of $85-195 in FIG. 4A. In other words, FIG. 4C presents a set of price adjustment options (430, 435, 440) for the user to select. Upon selection of a price adjustment option, the user is given a new price range. For example, the user may review the list of features (425) offered within the current price range of $85-195. The user may choose to accept the price range (430) after reviewing the list of features (425) offered with the price range, or the user may lower the price range to $85-180 by downgrading to a basic advice package (435) or to $85-150 by declining all advice packages and audit defense (440). Further, the user may choose to decline use of the tax preparation service (445) for the year regardless of the price adjustment options (430, 435, 440) listed.

Figure 5:
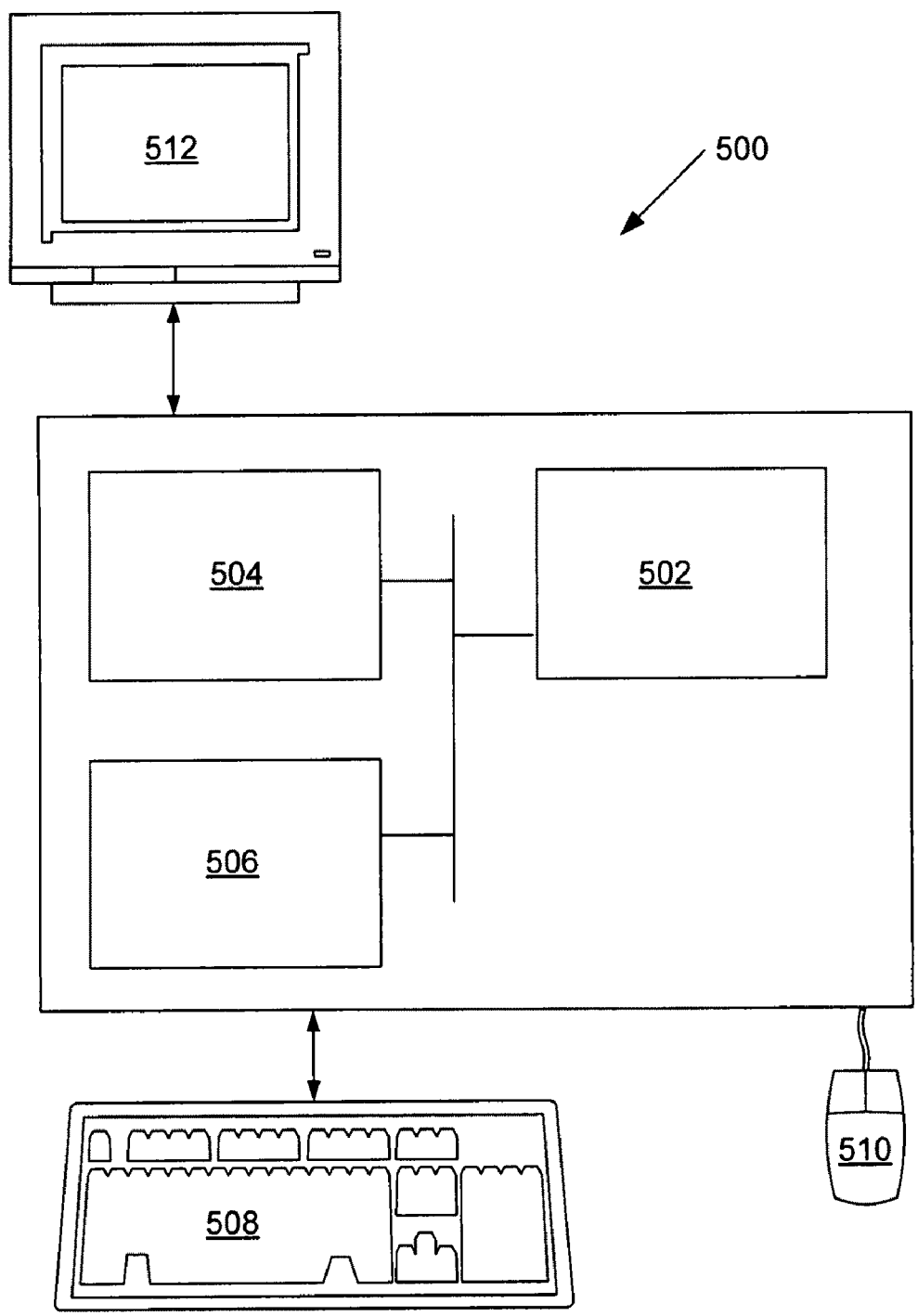
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., business management system, user interface, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer implemented method for determining a price for a tax preparation service, comprising:
    obtaining data about a prospective user of the tax preparation service, wherein the data comprises demographic data, financial data, tax data, service usage data, and historical price data;
    dynamically generating, using a processor of a computer, a price range for the tax preparation service based on the data about the prospective user and aggregate data about other users of the tax preparation service, wherein a portion of the data is used for tax preparation by the tax preparation service and the price range is generated by the tax preparation service;
    transmitting the price range to the prospective user;
    enabling access to the tax preparation service based on an acceptance of the price range by the prospective user; and
    transmitting a final price within the price range to the prospective user, wherein the final price is based on data about the prospective user gathered during actual use of the tax preparation service by the prospective user.

2. The computer implemented method of claim 1, further comprising:
    transmitting a price adjustment option to the prospective user based on the acceptance of the price range.

3. The computer implemented method of claim 1, wherein the price range is proportional to at least one selected from a group consisting of a net income and a number of deductions of the prospective user.

4. The computer implemented method of claim 3, wherein the data comprises at least one selected from a group consisting of a demographic of the prospective user, an income of the prospective user, a tax status of the prospective user, a tax obligation of the prospective user, a tax history of the prospective user, a tax complexity of the prospective user, a loyalty level of the prospective user, and a previous price for the service paid by the prospective user.

5. The computer implemented method of claim 3, wherein the loyalty level is based on a number of years of use of the tax preparation service by the prospective user.

6. The computer implemented method of claim 3, wherein access to the service is at least one selected from a group of features consisting of an investment tool, a rental property tool, a charitable contribution calculator, a deduction maximizing tool, a home business tool, a state filing tool, a refund tool, a tax review tool, and an audit protection tool.

7. The computer implemented method of claim 1, wherein the service is provided by an application service provider (ASP).

8. A system for determining a price for a tax preparation service, comprising:
    a user interface, wherein the user interface is configured to communicate with a prospective user of the tax preparation service; and
    a business management system, comprising:
        a fee management system, and
        a user data repository,
    wherein the fee management system dynamically generates a price range based on data about the prospective user and aggregate data about other users of the tax preparation service, wherein a portion of the data is used for tax preparation by the tax preparation service,
    wherein the fee management system enables access to the service by the prospective user based on an acceptance of the price range by the user, and
    wherein the fee management system determines a final price within the price range, wherein the final price is based on data about the prospective user gathered during actual use of the service by the prospective user.

9. The system of claim 8, wherein the user interface is further configured to initiate delivery of the price range to the prospective user.

10. The system of claim 8, wherein the user interface is further configured to present a price adjustment option to the user based on the acceptance of the price range.

11. The system of claim 8, wherein the price range is proportional to at least one selected from a group consisting of a net income and a number of deductions of the prospective user.

12. The system of claim 11, wherein data is at least one selected from a group consisting of a demographic of the prospective user, an income of the prospective user, a tax status of the prospective user, a tax obligation of the prospective user, a tax history of the prospective user, a tax complexity of the prospective user, a loyalty level of the prospective user, and a previous price for the service paid by the prospective user.

13. The system of claim 12, wherein the loyalty level is based on a number of years of use of the tax preparation service by the prospective user.

14. The system of claim 11, wherein access to the service is at least one selected from a group of features consisting of an investment tool, a rental property tool, a charitable contribution calculator, a deduction maximizing tool, a home business tool, a state filing tool, a refund tool, a tax review tool, and an audit protection tool.

15. The system of claim 8, wherein the business management system comprises an application service provider (ASP).

16. A computer readable storage medium containing software instructions embodied therein for causing a computer system to perform a method for determining a price for a service, the method comprising:
    obtaining data about a prospective user of the tax preparation service, wherein the data comprises demographic data, financial data, tax data, service usage data, and historical price data;
    dynamically generating, using a processor of a computer, a price range for the tax preparation service based on the data about the prospective user and aggregate data about other users of the tax preparation service, wherein a portion of the data is used for tax preparation by the tax preparation service and the price range is generated by the tax preparation service;
    transmitting the price range to the prospective user;
    enabling access to the tax preparation service based on an acceptance of the price range by the prospective user; and
    transmitting a final price within the price range to the prospective user, wherein the final price is based on data about the prospective user gathered during actual use of the tax preparation service by the prospective user.

17. The computer readable storage medium of claim 16, the method further comprising:

transmitting a price adjustment option to the prospective user based on the acceptance of the price range.

18. The computer readable storage medium of claim 16, wherein the price range is proportional to at least one selected from a group consisting of a net income and a number of deductions of the prospective user.

19. The computer readable storage medium of claim 18, wherein the data comprises at least one selected from a group consisting of a demographic of the prospective user, an income of the prospective user, a tax status of the prospective user, a tax obligation of the a tax history of the prospective user, a tax complexity of the prospective user, a loyalty of the prospective user, and a previous price for the service paid by the prospective user.

20. The computer readable storage medium of claim 19, wherein the loyalty level is based on a number of years of use of the tax preparation service by the prospective user.

21. The computer readable storage medium of claim 18, wherein access to the service is at least one selected from a group of features consisting of an investment tool, a rental property tool, a charitable contribution calculator, a deduction maximizing tool, a home business tool, a state filing tool, a refund tool, a tax review tool, and an audit protection tool.

22. The computer readable storage medium of claim 16, wherein the service is provided by an application service provider (ASP).

23. A method for obtaining user access to a service, comprising:
accessing a business management system, wherein the business management system provides the service;
receiving a first price range from the business management system, wherein the first price range is dynamically generated, using a processor of a computer, based on data about a prospective user and aggregate data about other users of the tax preparation service, wherein a portion of the data is used for providing the service and the price range is generated by the business management system;
accessing the service based on an acceptance of the first price range; and
receiving a final price within the first price range, wherein the final price is based on data about the prospective user gathered during actual use of the service by the user.

24. The method of claim 23, further comprising:
receiving a price adjustment option based on the acceptance of the first price range.

25. The method of claim 24, further comprising:
selecting the price adjustment option;
receiving a second price range, wherein the second price range is based on the price adjustment option;
accessing the service based on an acceptance of the second price range; and
receiving a final price within the second price range, wherein the final price is based on actual use of the service by the user.

26. The method of claim 23, wherein the service is at least one selected from a group consisting of a tax preparation service and a business management service.

27. The method of claim 26, wherein the data comprises at least one selected from a group consisting of a demographic of the user, an income of the user, a tax status of the user, a tax obligation of the user, a tax history of the user, a tax complexity of the user, a loyalty of the user, and a previous price for the service paid by the user.

28. The method of claim 26, wherein accessing the service comprises accessing at least one selected from a group of features consisting of an investment tool, a rental property tool, a charitable contribution calculator, a deduction maximizing tool, a home business tool, a state filing tool, a refund tool, a tax review tool, and an audit protection tool.

29. The method of claim 23, wherein the business management system comprises an application service provider (ASP).

* * * * *

UNITED STATES PATENT AND TRADEMARK OFFICE
CERTIFICATE OF CORRECTION

| | |
|---|---|
| PATENT NO. | : 7,788,137 B1 |
| APPLICATION NO. | : 11/788405 |
| DATED | : August 31, 2010 |
| INVENTOR(S) | : Alan Tifford |

Page 1 of 1

It is certified that error appears in the above-identified patent and that said Letters Patent is hereby corrected as shown below:

In Claim 19, column 11, line 11, "prospective user," should be added after "a tax obligation of the."

Signed and Sealed this

Ninth Day of November, 2010

David J. Kappos
*Director of the United States Patent and Trademark Office*